United States Patent [19]

Makino

[11] 4,040,303
[45] Aug. 9, 1977

[54] TWO MASS VIBRATORY MATERIAL HANDLING APPARATUS AND METHODS OF MANUFACTURING AND FINE TUNING THE SAME

[75] Inventor: Shinobu Makino, Kamakura, Japan

[73] Assignee: FMC Corporation, San Jose, Calif.

[21] Appl. No.: 610,593

[22] Filed: Sept. 5, 1975

[51] Int. Cl.² .......................................... F16H 33/00
[52] U.S. Cl. ....................................................... 74/61
[58] Field of Search ............................................ 74/61

[56] References Cited

U.S. PATENT DOCUMENTS

| 2,133,593 | 10/1938 | Tautz | 74/217 CV |
| 2,984,339 | 5/1961 | Musschoot | 74/61 |
| 3,040,591 | 6/1962 | Peregrine et al. | 74/61 |
| 3,089,582 | 5/1963 | Musschoot et al. | 74/61 |
| 3,387,499 | 6/1968 | Bruderlein | 74/61 |
| 3,682,254 | 8/1972 | Hoeffleur | 74/61 |

Primary Examiner—Samuel Scott
Assistant Examiner—Wesley S. Ratliff, Jr.
Attorney, Agent, or Firm—J. F. Verhoeven; J. W. Edwards; C. E. Tripp

[57] ABSTRACT

A two mass vibratory material handling apparatus has a first mass that includes a vibration exciter of the rotary eccentric weight type and a second mass that includes an object to be vibrated. The two masses are interconnected by resilient elements designed to permit a desired vibration amplification from the vibration exciter to the object to be vibrated. The vibration exciter has a drive with an adjustable drive ratio located between a fixed r.p.m. at full voltage motor drive shaft and a shaft that rotatably supports eccentric weights. Variable pitch pulleys or a set of pulleys having various pitch diameters and provided so that pitch diameters can be selected therefrom for mounting one pulley on each shaft with a drive belt trained about the pulleys and thus, provide a drive ratio enabling the fixed frequency motor to drive the eccentric weights at a selected operating frequency. The resilient elements can be designed to amplify vibration along a predetermined line of attack or to flex in that direction while amplifying vibration perpendicularly thereto or to provide a combination of such vibration amplifications to impart an elliptical motion to the second mass. The apparatus can be manufactured without undue care in maintaining a designed spring rate for the resilient elements or maintaining the designed weight of the two masses since after manufacture and assembly, the apparatus can be fine tuned by weighing the two masses, measuring the amplitude of vibration of the mass including the object to be vibrated at a known frequency, selecting an operating frequency for obtaining a desired vibration stroke, and adjusting the drive ratio to operate at that frequency.

4 Claims, 16 Drawing Figures

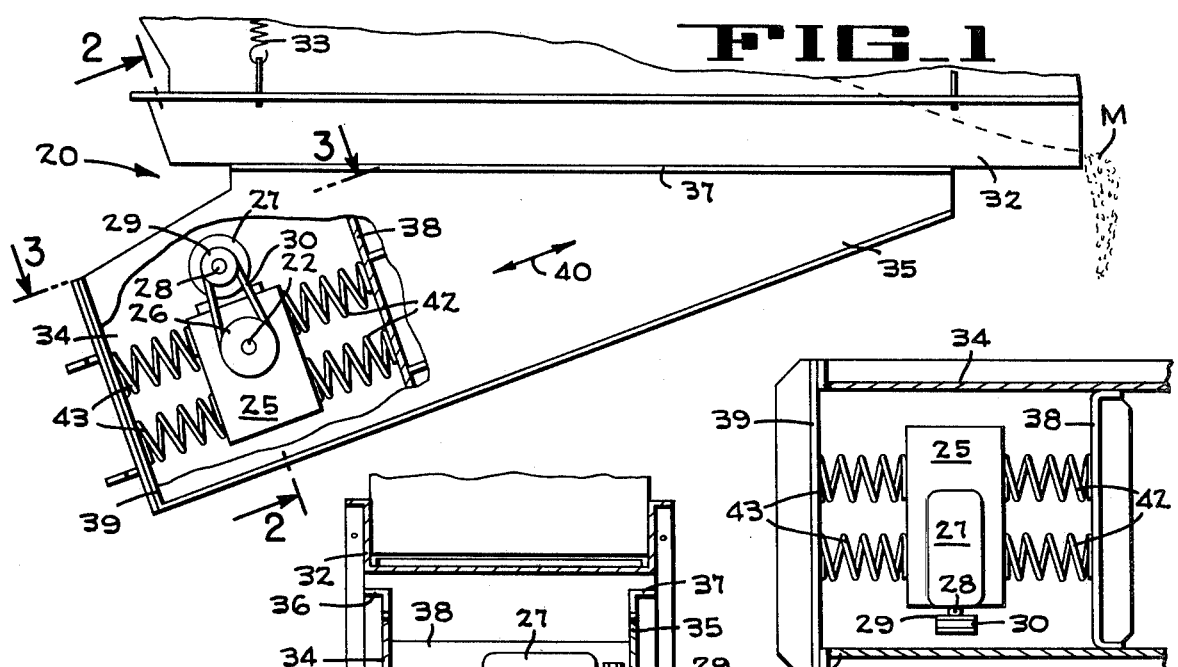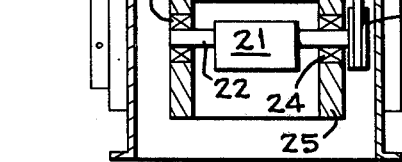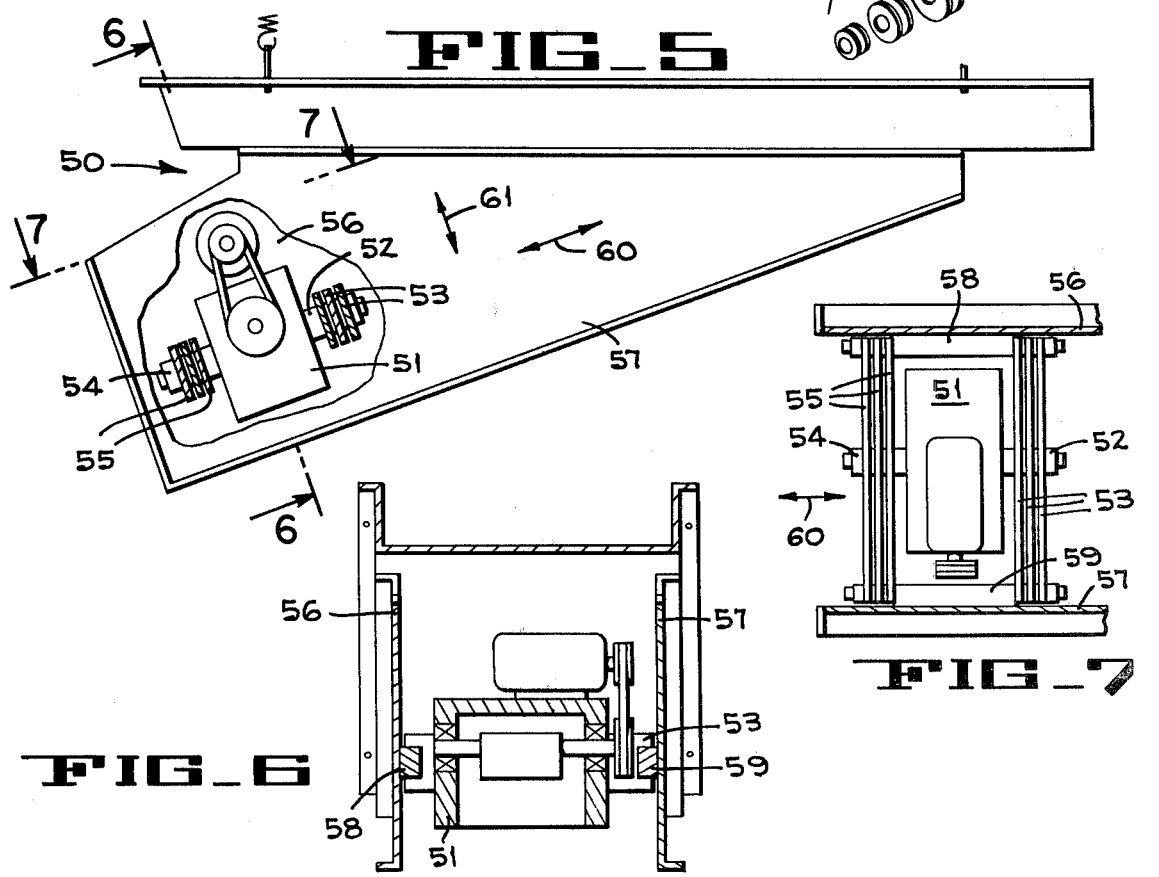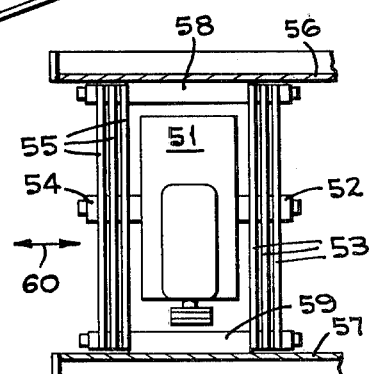

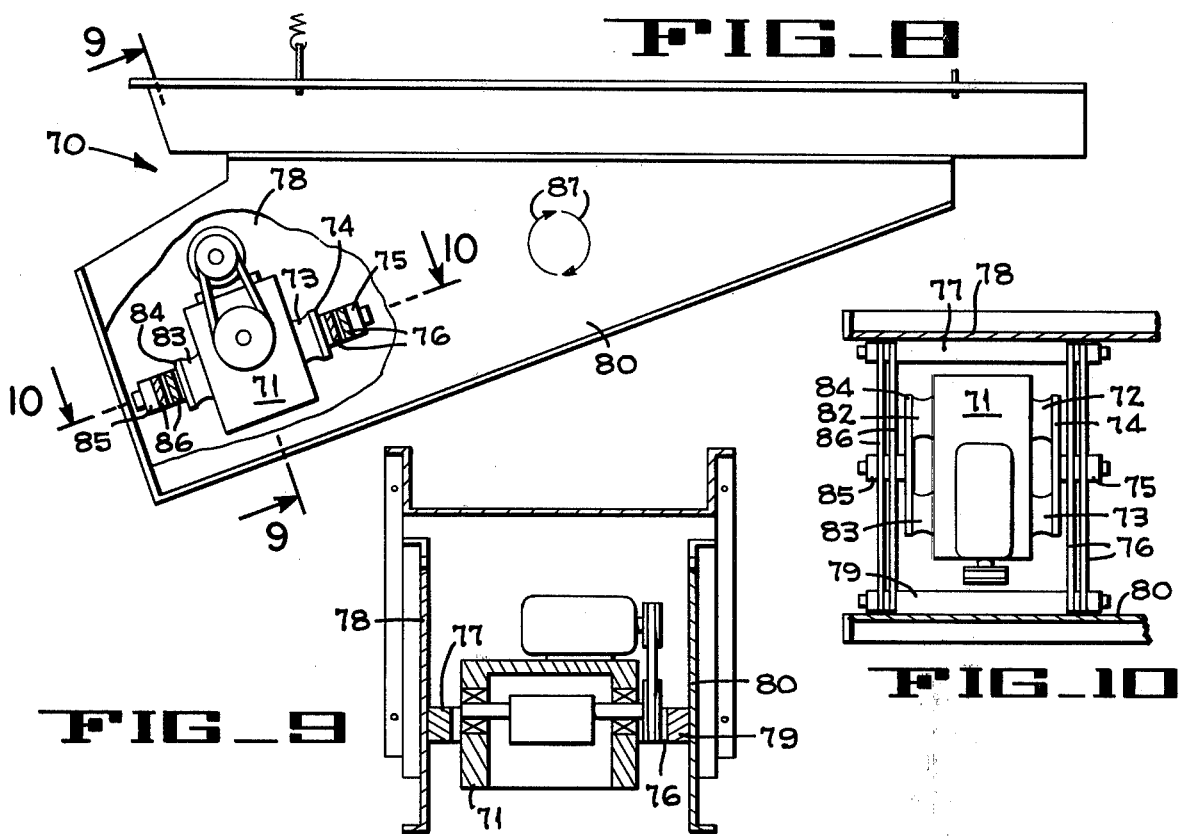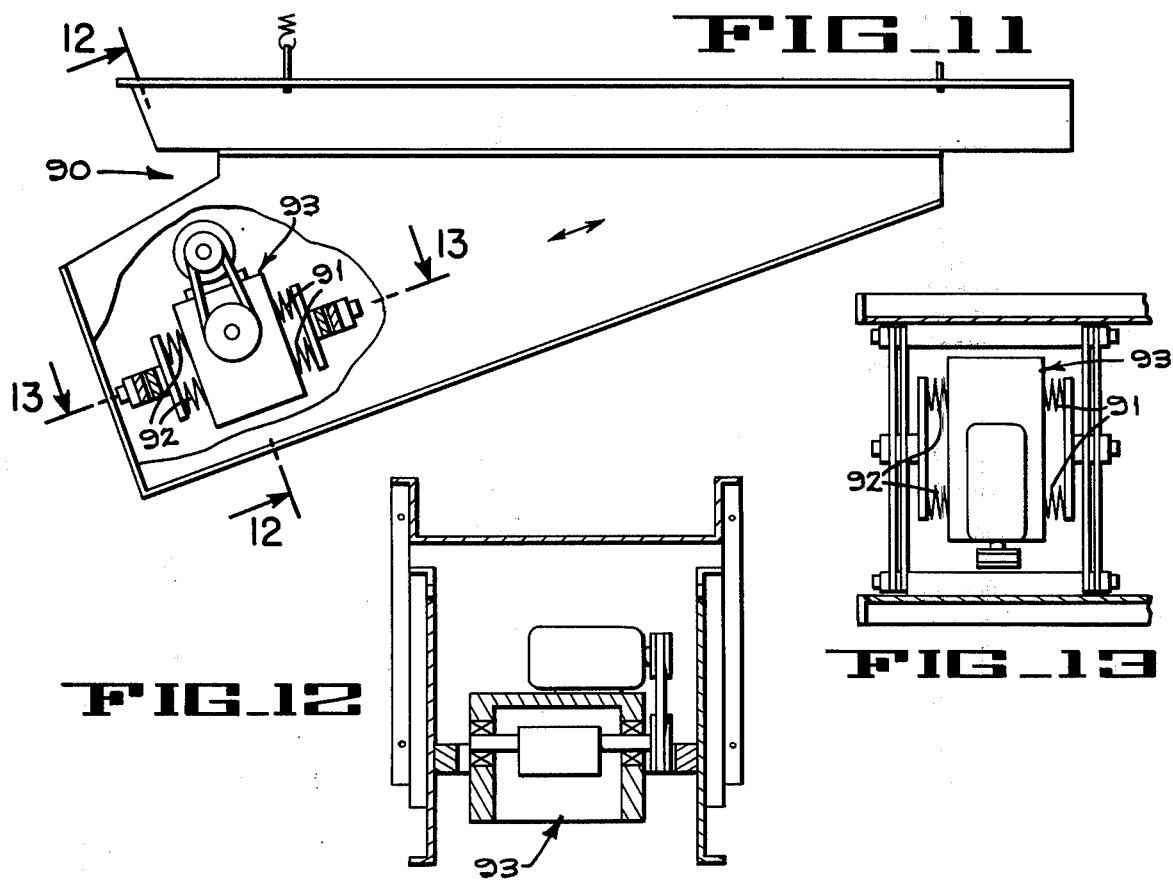

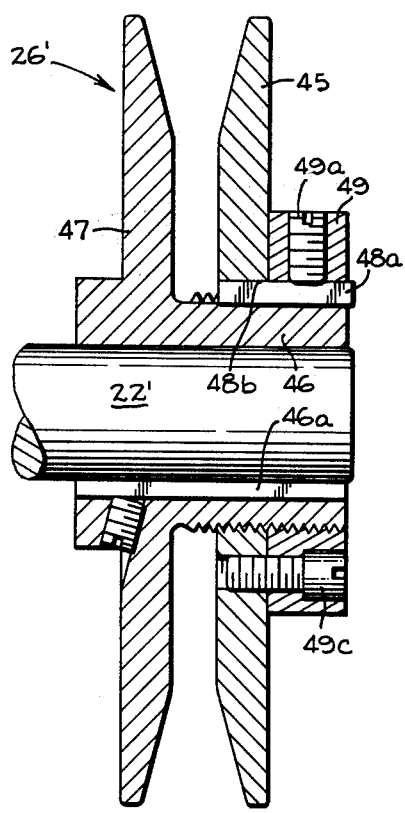
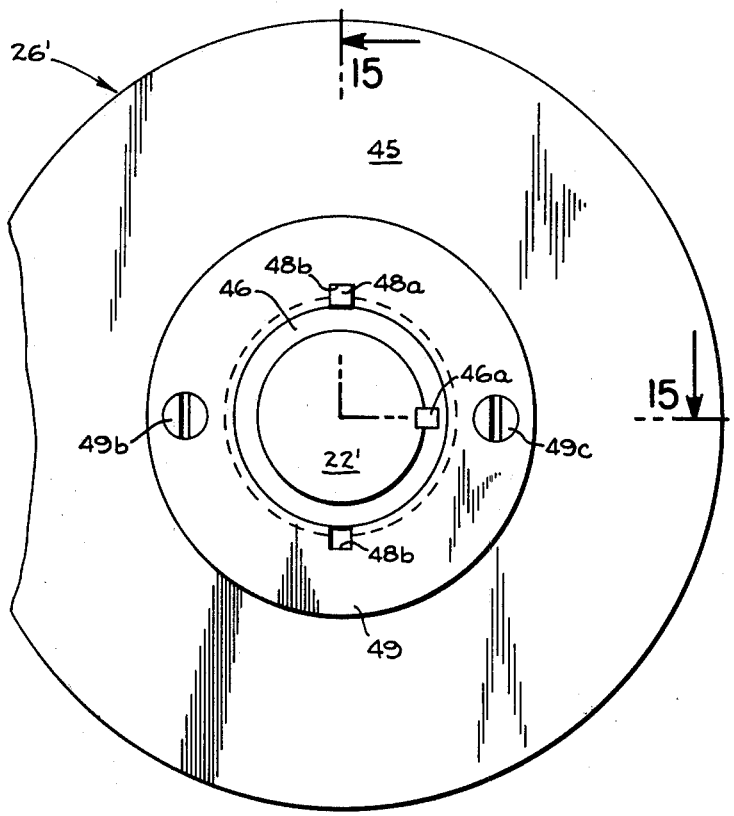
FIG_15  FIG_14
FIG_16
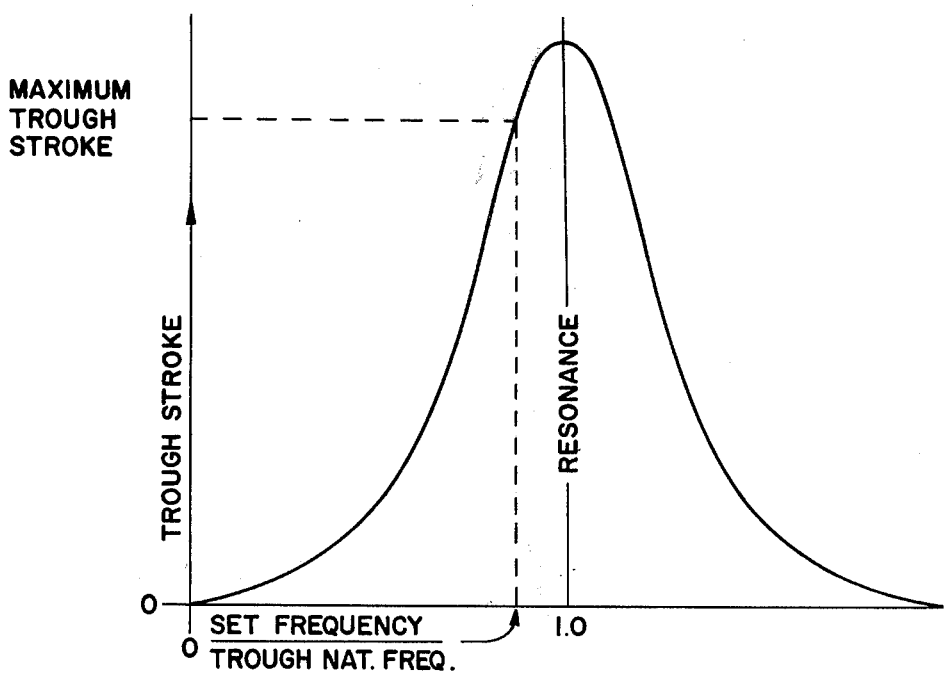
RATIO OF DRIVER OPERATING FREQUENCY TO TROUGH NATURAL FREQUENCY

TWO MASS VIBRATORY MATERIAL HANDLING APPARATUS AND METHODS OF MANUFACTURING AND FINE TUNING THE SAME

BACKGROUND OF THE INVENTION

1. Field of the Invention

This invention relates to vibratory material handling apparatus such as vibrating screens, feeders, conveyors and separators. More particularly, the invention pertains to a vibration exciter drive for a two mass vibratory system and to resilient elements for coupling the two masses.

2. Description of the Prior Art

A vibration exciter drive is shown in U.S. Pat. No. 3,703,236 and includes a fixed frequency drive motor shaft with a pulley mounted thereon, a rotary eccentric weight shaft with a pulley mounted thereon, and a drive belt trained about the pulleys. This drive is incorporated in a two mass vibratory system that includes a vibration exciter mounting having a rectangular tubular frame with elastomeric blocks positioned therein for supporting the vibration exciter. By variation of the number, sizes, placement or compression of the elastomeric blocks, the transmitted vibratory force component in the vertical and horizontal directions can be independently adjusted in order to obtain the desired vibratory motion in the vibrated structure and the desired natural frequency of vibration of the vibratory system.

A vibratory material handling apparatus with a rotating eccentric mass driver that is mounted on the apparatus by elastomeric bodies is shown in U.S. Pat. No. 3,583,553. The driver is driven by a fixed frequency motor mounted on the same shaft as the driver. Work producing vibrations are transmitted along an attack axis by compression of the elastomeric bodies while vibratory excursions other than in the direction of such attack axis are dissipated through flexure of the elastomeric bodies in shear. While the vibration exciter force is constant, changes in feed rate can result due to variations in the head load upon a pile of material to be vibrated.

In conventional two mass vibrating systems it is desirable to have a near resonance operation. Normally, it is not possible to change the operating frequency of the system and therefore it is necessary to change springs or weights after the system is assembled and operated. Variations in spring rates due to manufacturing tolerances and variations in trough weight due to both manufacturing tolerances and weight of material to be vibrated require adjustment of the natural frequency of the system for operation at a frequency near resonance level.

SUMMARY OF THE INVENTION

A two mass vibratory material handling apparatus has a vibration exciter drive with an adjustable drive ratio. Pulleys are mounted on shafts that extend from a fixed r.p.m. at full voltage motor and from a rotary eccentric weight and a drive belt is trained about the pulleys. Variable pitch pulleys or a series of pulleys having various pitch diameters are available from which pitch diameters can be selected for mounting one pulley on each shaft to provide a drive ratio that enables the fixed r.p.m. at full voltage motor to drive the eccentric weights at a selected operating frequency.

In manufacturing the above described apparatus that includes resilient elements interconnecting the two masses, the resilient elements are maufactured to have a designed spring rate within commonly accepted manufacturing tolerances. The two masses are manufactured to have designed weights within commonly accepted manufacturing tolerances. The vibration exciter is manufactured with a drive having an adjustable drive ratio. The two masses including the vibration exciter and the resilient elements are assembled and the drive ratio of the vibration exciter drive is adjusted to operate at a designed percentage of resonance so as to fine tune the assembled apparatus.

The present invention enables adjustment or selection of a drive ratio so that the assembled apparatus can vibrate at a given percentage of resonance or natural frequency, regardless of small variations in spring rates. Furthermore, the trough weight can vary over a considerable range and a common vibration exciter and spring system can be used. Fine tuning is achieved by selecting a proper operating frequency for the assembled apparatus and the material to be vibrated. A vibration exciter with high torsional inertias, and a spring system designed so that the natural frequency in the drive direction (along the line of attack) is above the operating frequency can be used and fine tuned for efficient operation.

BRIEF DESCRIPTION OF THE DRAWINGS

FIG. 1 is a broken side elevation view of a vibratory material handling apparatus embodying the present invention.

FIG. 2 is a section taken on the line 2—2 of FIG. 1.

FIG. 3 is a section taken on the line 3—3 of FIG. 1.

FIG. 4 is an exploded view of a set of pulleys having various pitch diameters.

FIG. 5 is a broken side elevation view of a modified form of vibratory material handling apparatus embodying the present invention.

FIG. 6 is a section taken on the line 6—6 of FIG. 5.

FIG. 7 is a section taken on the line 7—7 of FIG. 5.

FIG. 8 is a broken side elevation view of a second modified form of vibratory material handling apparatus embodying the present invention.

FIG. 9 is a section taken on the line 9—9 of FIG. 8.

FIG. 10 is a section taken on the line 10—10 of FIG. 8.

FIG. 11 is a broken side elevation view of a third modified form of vibratory material handling apparatus embodying the present invention.

FIG. 12 is a section taken on the line 12—12 of FIG. 11.

FIG. 13 is a section taken on the line 13—13 of FIG. 11.

FIG. 14 is a partial side elevation view of a variable pitch pulley.

FIG. 15 is a section taken on the line 15—15 of FIG. 14.

FIG. 16 is a graph illustrating the relation between the amplitude of the stroke of the trough and the ratio of the driver operating frequency to the trough natural frequency.

DESCRIPTION OF THE PREFERRED EMBODIMENTS

Looking now at FIGS. 1-3, a two mass vibratory material handling apparatus 20 such as a bulk material feeder is shown. The first mass includes a vibration exciter or driver having a rotary eccentric weight 21, shown in FIG. 2, being mounted upon a shaft 22 that is journalled within bearings 23 and 24 in a vibration exciter housing 25. A pulley 26 is mounted on one end of the shaft projecting outwardly from the housing. An electric motor 27 having a fixed r.p.m. at full line voltage is mounted upon the housing. A drive shaft 28 projects from the motor and a pulley 29 is mounted upon the drive shaft. A drive belt 30 is trained about the pulleys 26 and 29.

The second mass of the apparatus 20 includes a trough 32 for supporting an object to be vibrated such as bulk granular material M. The trough is suspended from an overhead support, not shown, by vibration isolation springs 33 (only one being shown in FIG. 1) that are located near the four corners of the trough and that enable the entire apparatus 20 to vibrate freely without a dampening effect by the support. A pair of vertical plates 34 and 35 having outwardly turned upper flanges 36 and 37, respectively, are secured to the bottom of the trough by welding or by fasteners attaching the flanges along each side of the trough bottom with the plates depending therefrom. A pair of drive plates 38 and 39 extend transversely between the vertical plates at locations fore and aft of the vibration exciter housing 25. These drive plates are aligned perpendicular to a predetermined line of attack or vibration as indicated by the double arrow 40.

The first and second masses are interconnected between the vibration exciter housing 25 and the forward drive plate 38 by four steel coil springs 42, as shown in FIGS. 1 and 3, and between the housing 25 and rearward drive plate 39 by four steel coil springs 43. These steel coil springs are designed to permit a desired vibration amplification from the vibration exciter of the first mass to the object to be vibrated within the second mass. Each steel coil spring has a length to mean diameter ratio that is greater than three and the springs are aligned longitudinally in a direction parallel with the predetermined line of attack as indicated by the double arrow 40. These springs permit a high vibration amplification axially parallel with the line of attack while providing a relatively low lateral vibration amplification to permit dissipation of the lateral vibrating forces.

The apparatus 20 can be manufactured by ordinary manufacturing methods with the springs 42 and 43 having spring rates that vary within commonly accepted manufacturing tolerances, such as plus or minus 10 percent. The weight of the trough 32 and also the weight of the material M to be vibrated can vary over a wide range, and after assembly such variations can be compensated for by fine tuning the apparatus as follows: The two masses are weighed separately and after assembly, the amplitude of vibration of the mass including the object to be vibrated is measured at a known frequency. From graphs such as FIG. 16 and the known values determined by measurement, an operating frequency for obtaining a desired vibration stroke can be selected. Knowing the operating frequency desired and the fixed r.p.m. at full voltage of the electric motor 27, the proper pitch diameters can be determined to provide the drive ratio for driving the eccentric weight 21 at the selected operating frequency.

A pair of pulleys 26 and 29 can be selected to provide the proper drive ratio from a set 44 of pulleys having various pitch diameters, as shown in FIG. 4. The selected pulleys are then installed on the shafts 22 and 28 and the apparatus 20 is fine tuned for the desired operation.

Alternately, the pulleys 26 and 29 that are mounted on the shafts 22 and 28 can be of a variable pitch type such as a pulley 26', shown in FIGS. 14 and 15. This pulley has a movable flange 45 that fits upon a threaded barrel 46 projecting from a fixed flange 47. By turning the movable flange on the barrel in a clockwise direction, the pitch of the pulley is increased and by turning the movable flange in a counterclockwise direction, the pitch of the pulley is decreased. The pulley pitch is adjustable in half turn increments of the movable flange to vary the width of the tapered slot between conical portions of the flanges. The movable flange is keyed to the barrel by a key 48a that fits within either of two diametrically opposed keyways 48b. The movable flange is locked in place with a locking collar 49 when a desired pitch setting is made. The locking collar has a set screw 49a fitting radially therein to bear upon the key 48a. Cap screws 49b and 49c attach the locking collar to the movable flange. The threaded barrel 46 is keyed to a shaft 22' by a shear key 46a. Such pulleys can be adjusted to provide the proper drive ratio and the apparatus 20 is fine tuned for the desired operation.

After the tuning operation has been completed, the drive ratio between the motor 27 and the eccentric weight 21 is constant. Therefore, the operating speed of the driver is directly proportional to the speed of the motor. At full voltage, the motor is at its maximum operating speed or nominal speed, and the operating frequency of the driver is at its maximum frequency or set frequency. When the voltage supplied to the motor is reduced, the operating frequency of the driver decreases and the ratio of the driver frequency to the trough natural frequency decreases.

FIG. 16 shows the relationship between the amplitude of the stroke of the second mass (trough) and the ratio of the driver operating frequency to the trough natural frequency. As shown in FIG. 16, the trough stroke is at its maximum when the driver is operated at the set frequency and the stroke is reduced whenever the driver is operated at any lower frequency. Since the feed rate is proportional to the trough stroke, the operator can select a desired feed rate up to the maximum rate by adjusting the voltage supplied to the motor, thus lowering the motor r.p.m. Means for adjusting the voltage supplied to a motor are well known in the art of motor speed control.

With reference to FIGS. 5, 6 and 7, a second embodiment of the invention is illustrated by a vibratory material handling apparatus 50. This apparatus differs from the previously described vibratory material handling apparatus 20 in the resilient elements that interconnect the two masses for a desired vibration amplification. In the apparatus 50, a vibration exciter housing 51 has a forward mounting clamp 52 that is coupled to spaced leaf springs 53 and a rear mounting clamp 54 that is coupled to spaced leaf springs 55. The leaf springs extend transversely between vertical plates 56 and 57 where the ends of the springs are clamped in mounting clamp brackets 58 and 59. The leaf springs are arranged to flex in a direction along a predetermined line of attack, as indicated by the double arrow 60 in FIGS. 5 and 7. If the operating frequency is close to the natural frequency in that direction, the vibration amplification will be maximum in that direction. Since the leaf springs are substantially rigid in a direction perpendicular to the line of attack, as indicated by the double arrow 61 in FIG. 5, vibration amplification is minimum in this direction.

Looking now at FIGS. 8, 9 and 10, a third embodiment of the invention is shown by a two mass vibratory material handling apparatus 70. This apparatus differs from the previously described vibratory material handing apparatuses 20 and 50 in the resilient elements that interconnect the two masses for a desired vibration amplification. In the apparatus 70, a vibration exciter housing 71 is supported at its forward end by a pair of elastomer or rubber compression springs 72 and 73 that extend axially parallel to a predetermined line of attack to support a transversely extending mounting plate 74. A mounting clamp 75 projects forwardly from the mounting plate along the line of attack and is coupled to a pair of transversely extending leaf springs 76. A bracket mounting clamp 77 is provided to attach one end of the leaf springs to a vertical plate 78 and a bracket mounting clamp 79 is provided to attach the other end of the leaf springs to a vertical plate 80.

The rear end of the exciter housing 71 is supported by a pair of elastomer or rubber compression springs 82 and 83 that extend axially parallel to a predetermined line of attack to support a transversely extending mounting plate 84. A mounting clamp 85 projects rearwardly from the mounting plate 84 along the line of attack and is coupled to a pair of transversely extending leaf springs 86. The ends of the leaf springs are attached to the bracket mounting clamps 77 and 79. The combination of axial compression springs and transverse leaf springs together with the ability to select operating frequencies of vibration along the line of attack that are close to the frequencies of vibration perpendicular to the line of attack provides for an elliptical motion on the trough, as indicted by the arrows 87 in FIG. 8, and such motion is useful for material agitation in screening or material separation.

FIGS. 11, 12 and 13 illustrate a fourth embodiment of the invention which is incorporated in a two-mass vibratory material handling apparatus 90. This apparatus is substantially the same as the previously described apparatus 70 with the exception that four steel coil springs 91 have been substituted for the rubber compression springs 72 and 73 and four steel coil springs 92 have been substituted for the rubber compression springs 82 and 83. This spring arrangement can be designed so that the natural frequency in the drive direction (along the line of attack) is near the operating frequency while the natural frequency perpendicular to the line of attack is not close to the operating frequency. This system imparts nearly linear motion to the second mass and such motion is useful for feeding and conveying. A vibration exciter 93 having high torsional inertias can be used and fine tuned for efficient operation with this spring arrangement.

Thus, the present invention permits adjustment or selection of a drive ratio so that an assembled two mass vibratory material handling apparatus can vibrate at a given percentage of resonances or natural frequency, regardless of small variations in spring rates. A wide range of variation in trough weight can be compensated for by selecting a proper operating frequency and adjusting the drive ratio accordingly. Vibration exciters having high torsional inertias can be used with spring arrangements for imparting either an elliptical motion or a linear motion to an object to be vibrated, and such apparatus can be fine tuned for efficient operation.

Although the best mode contemplated for carrying out the present invention has been herein shown and described, it will be apparent that modifiction and variation may be made without departing from what is regarded to be the subject matter of the invention.

What is claimed is:

1. A two mass vibratory material handling apparatus comprising a first mass, a second mass, and a plurality of resilient elements that interconnect the first and second masses, said first mass including a vibration exciter of the rotary eccentric weight type with an adjustable drive for driving the vibration exciter, said drive including a fixed r.p.m. at full voltage motor with a drive shaft extending therefrom, a driven rotary eccentric weight shaft extending from the exciter, a pulley on the drive shaft of the fixed r.p.m. at full voltage motor, a pulley on the driven rotary eccentric weight shaft, and a drive belt trained about the pulleys, said adjustable drive including means for adjusting the drive ratio of the pulleys to enable the fixed r.p.m. at full voltage motor to drive the driven rotary eccentric weight shaft at a selected operating frequency, said second mass including a trough for supporting an object to be vibrated within the trough, said second mass together with the object to be vibrated being subject to variations in weight, said resilient elements providing the sole support for said first mass, said resilient elements having fixed spring rates that influence the natural frequency of vibration for the apparatus in predetermined directions from the vibration exciter to the object to be vibrated, said resilient elements interconnecting the first and second masses including a plurality of steel coil springs located between the vibration exciter and the second mass, said coil springs being aligned longitudinally in a direction parallel with a predetermined line of attack and having a length to mean diameter ratio greater than three.

2. A two mass vibratory material handling apparatus comprising a first mass, a second mass, and a plurality of resilient elements that interconnect the first and second masses, said first mass including a vibration exciter of the rotary eccentric type with an adjustable drive for driving the vibration exciter, said driver including a fixed r.p.m. at full voltage motor with the drive shaft extending therefrom, a driven rotary eccentric weight shaft extending from the exciter, a pulley on the drive shaft of the fixed r.p.m. at full voltage motor, a pulley on the driven rotary eccentric weight shaft and a drive belt trained about the pulleys, said adjustable drive including means for adjusting the drive ratio of the pulleys to enable the fixed r.p.m. at full voltage motor to drive the driven rotary eccentric shaft at a selected operating frequency, said second mass including a trough for supporting an object to be vibrated within the trough, said second mass together with the object to be vibrated being subject to variations in weight, said resilient elements providing the sole support for said first mass, said reslient elements having fixed spring rates that influence the natural frequency of vibration for the apparatus in predetermined directions from the vibration exciter to the object to be vibrated, said resilient elements interconnecting the first and second masses including a plurality of leaf springs arranged to flex in a direction along a predetermined line of attack and to provide a substantially rigid coupling between the masses in a direction perpendicular to the line of attack.

3. A two mass vibratory material handling apparatus comprising a first mass, a second mass, and a plurality of resilient elements that interconnect the first and second masses, said first mass including a vibration exciter of the rotary eccentric weight type with an adjustable drive for driving the vibration exciter, said drive including a fixed r.p.m. at full voltage motor with a drive shaft extending therefrom, a driven rotary eccentric weight shaft extending from the exciter, a pulley on the drive shaft of the fixed r.p.m. at full voltage motor, a pulley on the driven rotary eccentric weight shaft, and a drive belt trained about the pulleys, said adjustable drive including means for adjusting the drive ratio of the pulleys to enable the fixed r.p.m. at full voltage motor to drive the driven rotary eccentric weight shaft at a selected operating frequency, said second mass including a trough for supporting an object to be vibrated within the trough, said second mass together with the object to be vibrated being subject to variations in weight, said reslient elements providing the sole support for said first mass, said resilient elements having fixed spring rates that influence the natural frequency of vibration for the apparatus in predetermined directions from the vibration exciter to the object to be vibrated, said resilient elements including a combination of leaf springs arranged to flex in a direction along a predetermined line of attack and steel coil springs aligned longitudinally along the line of attack.

4. A two mass vibratory material handling apparatus comprising a first mass, a second mass, and a plurality of resilient elements that interconnect the first and second masses, said first mass including a vibration exciter of the rotary eccentric weight type with an adjustable drive for driving the vibration exciter, said drive including a fixed r.p.m. at full voltage motor with a drive shaft extending therefrom, a driven rotary eccentric weight shaft extending from the exciter, a pulley on the drive shaft of the fixed r.p.m. at full voltage motor, a pulley on the driven rotary eccentric weight shaft, and a drive belt trained about the pulleys, said adjustable drive including means for adjusting the drive ratio of the pulleys to enable the fixed r.p.m. at full voltage motor to drive the driven rotary eccentric weight shaft at a selected operating frequency, said second mass including a trough for supporting an object to be vibrated within the trough, said second mass together with the object to be vibrated being subject to variations in weight, said resilient elements providing the sole support for said first mass, said resilient elements having fixed spring rates that influence the natural frequency of vibration for the apparatus in predetermined directions from the vibration exciter to the object to be vibrated, said resilient elements including a combination of leaf springs arranged to flex in a direction along a predetermined line of attack and rubber compression springs aligned longitudinally along the line of attack.

* * * * *